US010035063B2

(12) United States Patent
Hammontree et al.

(10) Patent No.: US 10,035,063 B2
(45) Date of Patent: *Jul. 31, 2018

(54) GAME CONTROLLER ON MOBILE TOUCH-ENABLED DEVICES

(71) Applicant: Microsoft Technology Licensing, LLC, Redmond, WA (US)

(72) Inventors: Monty Lee Hammontree, Duvall, WA (US); Tyler Edward Gibson, Seattle, WA (US); Emmanuel John Athans, Lake Forest Park, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 64 days.

This patent is subject to a terminal disclaimer.

(21) Appl. No.: 14/887,649

(22) Filed: Oct. 20, 2015

(65) Prior Publication Data
US 2016/0041717 A1 Feb. 11, 2016

Related U.S. Application Data

(63) Continuation of application No. 14/173,802, filed on Feb. 5, 2014, now Pat. No. 9,174,124, which is a (Continued)

(51) Int. Cl.
*A63F 13/42* (2014.01)
*A63F 13/92* (2014.01)
(Continued)

(52) U.S. Cl.
CPC .............. *A63F 13/42* (2014.09); *A63F 13/06* (2013.01); *A63F 13/211* (2014.09);
(Continued)

(58) Field of Classification Search
CPC ...... A63F 13/211; A63F 13/42; A63F 13/428; A63F 13/92; A63F 2300/105; A63F 2300/1075; A63F 2300/6045
See application file for complete search history.

(56) References Cited

U.S. PATENT DOCUMENTS 4,925,189 A * 5/1990 Braeunig ................ A63F 13/06
273/148 B
5,059,958 A * 10/1991 Jacobs ................... G06F 3/0338
200/61.47
(Continued)

FOREIGN PATENT DOCUMENTS

CN 101129076 A 2/2008
CN 102047207 A 5/2011
(Continued)

OTHER PUBLICATIONS

Mario Kart Double Dash!! Nov. 2003.*
(Continued)

*Primary Examiner* — David Duffy
(74) *Attorney, Agent, or Firm* — Medley, Behrens & Lewis, LLC

(57) ABSTRACT

Various technologies described herein pertain to controlling a game with a mobile touch-enabled device. A thumbstick and a mode selection button can be rendered on a display of the mobile touch-enabled device. The thumbstick can be rendered on a reassignable area of the display and the mode selection button can be rendered on a mode selection area of the display. A touch (e.g., drag) from the mode selection area to the reassignable area can be detected, and an operation in the game can be controlled with the thumbstick represented as being at a depressed height in response to the touch in the reassignable area while the touch is detected without discontinuity of contact from starting the drag. Further, upon detecting discontinuation of the touch, a different operation
(Continued)

in the game can be controlled with the thumbstick represented as being at a default height in response to a subsequent touch.

20 Claims, 9 Drawing Sheets

Related U.S. Application Data continuation of application No. 13/252,207, filed on Oct. 4, 2011, now Pat. No. 8,678,927.

(51) Int. Cl.

| | |
|---|---|
| A63F 13/211 | (2014.01) |
| A63F 13/285 | (2014.01) |
| A63F 13/533 | (2014.01) |
| A63F 13/20 | (2014.01) |
| A63F 13/426 | (2014.01) |
| A63F 13/2145 | (2014.01) |
| A63F 13/213 | (2014.01) |
| G06F 3/01 | (2006.01) |
| G06F 3/0488 | (2013.01) |
| A63F 13/428 | (2014.01) |

(52) U.S. Cl.
CPC ........ *A63F 13/213* (2014.09); *A63F 13/2145* (2014.09); *A63F 13/285* (2014.09); *A63F 13/426* (2014.09); *A63F 13/533* (2014.09); *A63F 13/92* (2014.09); *G06F 3/017* (2013.01); *G06F 3/0488* (2013.01); *A63F 13/428* (2014.09); *A63F 2300/1075* (2013.01); *A63F 2300/308* (2013.01); *A63F 2300/6045* (2013.01)

(56) References Cited

U.S. PATENT DOCUMENTS

| | | | | |
|---|---|---|---|---|
| 6,861,946 | B2* | 3/2005 | Verplaetse | G06F 1/1626 340/315 |
| 7,358,956 | B2 | 4/2008 | Hinckley et al. | |
| 7,422,145 | B2 | 9/2008 | Nurmela et al. | |
| 7,474,772 | B2 | 1/2009 | Russo et al. | |
| 8,382,591 | B2 | 2/2013 | Toy et al. | |
| 8,591,334 | B2* | 11/2013 | Baccichet | G06F 3/0488 463/37 |
| 8,678,927 | B2 | 3/2014 | Hammontree et al. | |
| 8,696,471 | B2 | 4/2014 | Sakakibara et al. | |
| 8,840,472 | B2* | 9/2014 | Toy | A63F 13/10 463/37 |
| 2002/0097229 | A1* | 7/2002 | Rose | G06F 1/1626 345/173 |
| 2002/0167699 | A1* | 11/2002 | Verplaetse | G06F 1/1626 398/154 |
| 2006/0287088 | A1 | 12/2006 | Mashimo et al. | |
| 2007/0178974 | A1 | 8/2007 | Masuyama et al. | |
| 2007/0265081 | A1 | 11/2007 | Shimura et al. | |
| 2008/0085769 | A1 | 4/2008 | Lutnick et al. | |
| 2008/0132333 | A1 | 6/2008 | Kogo | |
| 2008/0273755 | A1 | 11/2008 | Hildreth | |
| 2009/0115644 | A1* | 5/2009 | Hsieh | G06F 3/017 341/23 |
| 2009/0280910 | A1 | 11/2009 | Gagner et al. | |
| 2010/0041480 | A1 | 2/2010 | Wong et al. | |
| 2010/0060475 | A1* | 3/2010 | Choi | G06F 1/1616 340/689 |
| 2010/0069159 | A1 | 3/2010 | Yamada et al. | |
| 2010/0124967 | A1 | 5/2010 | Lutnick et al. | |
| 2011/0077083 | A1 | 3/2011 | Ahn et al. | |
| 2011/0081969 | A1 | 4/2011 | Ikeda et al. | |
| 2011/0109546 | A1* | 5/2011 | Milne | G06F 1/1694 345/158 |
| 2011/0172013 | A1* | 7/2011 | Shirasaka | G06F 3/0488 463/37 |
| 2011/0300934 | A1* | 12/2011 | Toy | A63F 13/2145 463/31 |
| 2011/0316888 | A1* | 12/2011 | Sachs | G06F 1/1626 345/667 |
| 2012/0075182 | A1* | 3/2012 | Kim | G06F 3/0338 345/158 |
| 2012/0162143 | A1 | 6/2012 | Kai et al. | |
| 2012/0242584 | A1 | 9/2012 | Tuli | |
| 2012/0242590 | A1* | 9/2012 | Baccichet | G06F 3/0488 345/173 |
| 2012/0268421 | A1 | 10/2012 | Suetomi et al. | |
| 2012/0270637 | A1 | 10/2012 | Lutnick et al. | |
| 2012/0284673 | A1 | 11/2012 | Lamb et al. | |
| 2013/0023337 | A1* | 1/2013 | Bowers | G07F 17/32 463/25 |
| 2013/0024806 | A1* | 1/2013 | Funabashi | G06F 3/04886 715/781 |
| 2013/0084980 | A1 | 4/2013 | Hammontree et al. | |
| 2013/0190083 | A1* | 7/2013 | Toy | A63F 13/2145 463/31 |
| 2013/0225295 | A1* | 8/2013 | Lee | A63F 13/2145 463/37 |

FOREIGN PATENT DOCUMENTS

| | | |
|---|---|---|
| EP | 1621238 A1 | 2/2006 |
| EP | 1671685 A2 | 6/2006 |
| EP | 2361658 A2 | 8/2011 |
| JP | 2001170358 A | 6/2001 |
| JP | 2005211260 A | 8/2005 |
| JP | 2008017935 A | 1/2008 |
| JP | 2010526391 A | 7/2010 |
| JP | 2011141632 A | 7/2011 |

OTHER PUBLICATIONS

"Non-Final Office Action Issued in U.S. Appl. No. 13/252,207", dated Dec. 21, 2012, 15 Pages.
"Non-Final Office Action Issued in U.S. Appl. No. 13/252,207", dated Mar. 22, 2013, 16 Pages.
"Notice of Allowance Issued in U.S. Appl. No. 13/252,207", dated Nov. 5, 2013, 14 Pages.
"Notice of Allowance Issued in U.S. Appl. No. 14/173,802", dated Jul. 9, 2015, 11 Pages.
"Notice of Allowance Issued in Chinese Patent Application No. 201210378722.1", dated Mar. 2, 2015, 4 Pages.
"Office Action Issued in Japanese Patent Application No. 2014-534644", dated Oct. 18, 2016, 4 Pages.
"AndroFlight", Retrieved at «https://sites.google.com/site/androflight/», Retrieved Date: Jul. 14, 2011, 2 Pages.
"International Search Report", dated Feb. 28, 2013, Application No. PCT/US2012/058505, Filed Date: Oct. 3, 2012, pp. 1-9.
"First Office Action and Search report received for Chinese Patent Application No. 201210378722.1", dated Jul. 3, 2014, 11 Pages.
McFerran, Damien. Sky Gamblers: Rise of Glory review [online]. Oct. 20, 2011 [retrieved on Jun. 25, 2015]. Retrieved from the Internet: <URL: http://www.pocketgamer.co.uk/r/Multiformat/Sky+Gamblers%3A+Rise+of+Glory/review.asp?c=34504>.
"Supplementary Search Report Received for European Patent Application No. 12837796.7", dated Jun. 17, 2015, 13 Pages.
"iPhone Development Tutorial—UITableView edit mode", Retrieved At: «https://www.youtube.com/watch?v=N_Q_io5M-3s», Published on: Sep. 6, 2011, 1 Page.
McAllister, Graham, "A Guide to iOS Twin Stick Shooter Usability", Retrieved At : «http://www.gamasutra.com/view/feature/134693/a_guide_to_ios_twin_stick_shooter_.php?print=1», Published on: May 30, 2011, 16 Pages.

\* cited by examiner

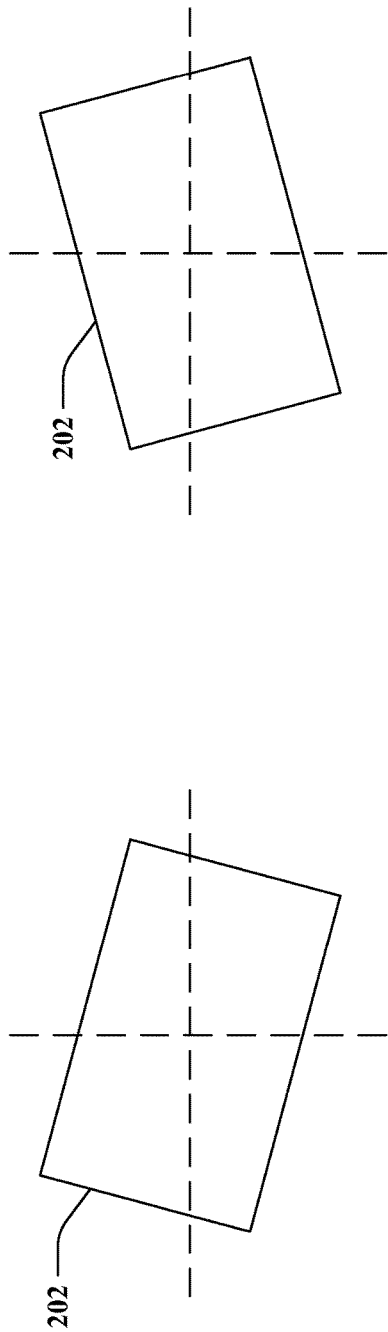
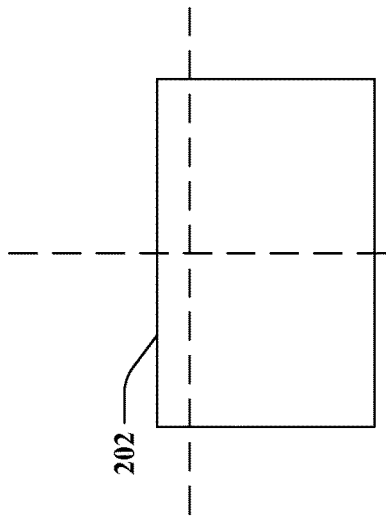
FIG. 10
FIG. 11
FIG. 12

GAME CONTROLLER ON MOBILE TOUCH-ENABLED DEVICES

CROSS-REFERENCE TO RELATED APPLICATION

This application is a continuation of U.S. Pat. No. 9,174,124, filed on Feb. 5, 2014, and entitled "GAME CONTROLLER ON MOBILE TOUCH-ENABLED DEVICES", which is a continuation of U.S. Pat. No. 8,678,927, filed on Oct. 4, 2011, and entitled "GAME CONTROLLER ON MOBILE TOUCH-ENABLED DEVICES". The entireties of these applications are incorporated herein by reference.

BACKGROUND

Video games typically involve user interaction to generate visual feedback on a display. For instance, controllers are oftentimes used to manipulate games. According to an example, a controller can be employed to manipulate a game executed on a video game console, which can cause visual content to be rendered on a display (e.g., television, monitor, etc.). An example of an early controller employed to manipulate a game is a joystick that includes one button. However, modern controllers with a plurality of analog and discrete inputs have more recently become more prevalent. By way of illustration, controllers employed with video game consoles commonly include analog thumbstick(s), analog trigger(s), discrete button(s), and/or directional pad(s). Accordingly, games that can be executed on consoles have become more sophisticated to take advantage of the variety of inputs provided by the modern controllers.

As mobile touch-enabled devices have become more ubiquitous, versions of console-based games that can be executed on mobile touch-enabled devices have become more commonly available. However, a user experience when interacting with a version of a game on a mobile touch-enabled device is oftentimes degraded as compared to a user experience when interacting with a version of that game on the video game console. The user experience can be detrimentally impacted, for example, since mobile touch-enabled devices conventionally fail to provide tactile feedback similar to controllers for consoles.

Moreover, the user experience can be degraded since mobile touch-enabled devices are typically relegated to using less complex control models with fewer inputs compared to control models employed by controllers for consoles. For example, a mobile touch-enabled device commonly has two points of control (e.g., the two thumbs), while a conventional controller for a console oftentimes has more than the two points of control. When the mobile touch-enabled device is held by the user, the user can touch a display of the mobile touch-enabled device with her two thumbs, while her other fingers are typically used to hold the mobile touch-enabled device. Further, if the user tries to hold the mobile touch-enabled device with more fingers on the display (e.g., a thumb and at least one additional finger of a hand), then a natural range of motion of her thumbs can be limited, particularly for larger mobile touch-enabled devices. In contrast, a conventional controller oftentimes includes triggers and/or buttons positioned to be operated by fingers other than the thumbs of the user when the controller is being held. If a less complex control model is utilized with a mobile touch-enabled device, then some operations that can be manipulated by a user in a version of a game for a console can be unavailable in a version of the game for the mobile touch-enabled device, which can result in a diminished user experience.

SUMMARY

Described herein are various technologies that pertain to controlling a game with a mobile touch-enabled device. A thumbstick can be rendered on a reassignable area of the display of the mobile touch-enabled device. Further, a mode selection button can be rendered on a mode selection area of the display. A first operation in the game can be controlled in response to a first touch detected within the reassignable area of the display. For instance, the thumbstick can be represented as being at a default height when the first operation is controlled. Moreover, a second touch, which can be a drag from the mode selection area to the reassignable area, can be detected. A second operation in the game can thereafter be controlled in response to a third touch, where the second touch and the third touch are detected without discontinuity of contact. The thumbstick can be represented as being at a depressed height when the second operation is controlled. Further, the third touch can be detected to be discontinued, and the first operation in the game can be controlled in response to a fourth touch detected within the reassignable area of the display. The detected discontinuation of the third touch can switch the thumbstick from being represented at the depressed height to being represented at the default height.

According to various embodiments described herein, a toggle button can be rendered on a toggle area of the display of the mobile touch-enabled device. If a touch is detected within the toggle area of the display when the thumbstick is rendered on the reassignable area of the display, then a switch from rendering the thumbstick on the reassignable area of the display to rendering a directional pad on the reassignable area of the display can be effectuated. Moreover, a touch can be detected within the reassignable area of the display when the directional pad is rendered thereupon, and an operation in the game can be controlled in response thereto. The operation, for instance, can differ from the operations in the game that can be controlled in response to touches detected in the reassignable area when the thumbstick is rendered on the reassignable area (e.g., with the thumbstick represented as being at a default height or a depressed height).

In accordance with other embodiments set forth herein, output of a sensor can be utilized to control one or more operations in the game executed on the mobile touch-enabled device. The sensor can be a gyroscope, an accelerometer, a camera, or the like. In some embodiments, the output of the sensor can be used to detect a degree of tilt of the mobile touch-enabled device and/or whether the mobile touch-enabled device is rotated, which can be employed to control operation(s) in the game. Additionally or alternatively, in various embodiments, the output of the sensor can be employed to detect a gesture, and an operation in the game can be controlled as a function of the detected gesture.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or

BRIEF DESCRIPTION OF THE DRAWINGS

FIGS. 10-12 illustrate additional exemplary orientations of the mobile touch-enabled device that can be utilized to manipulate operations in the game rendered on the display of the mobile touch-enabled device.

DETAILED DESCRIPTION

Figure 1:
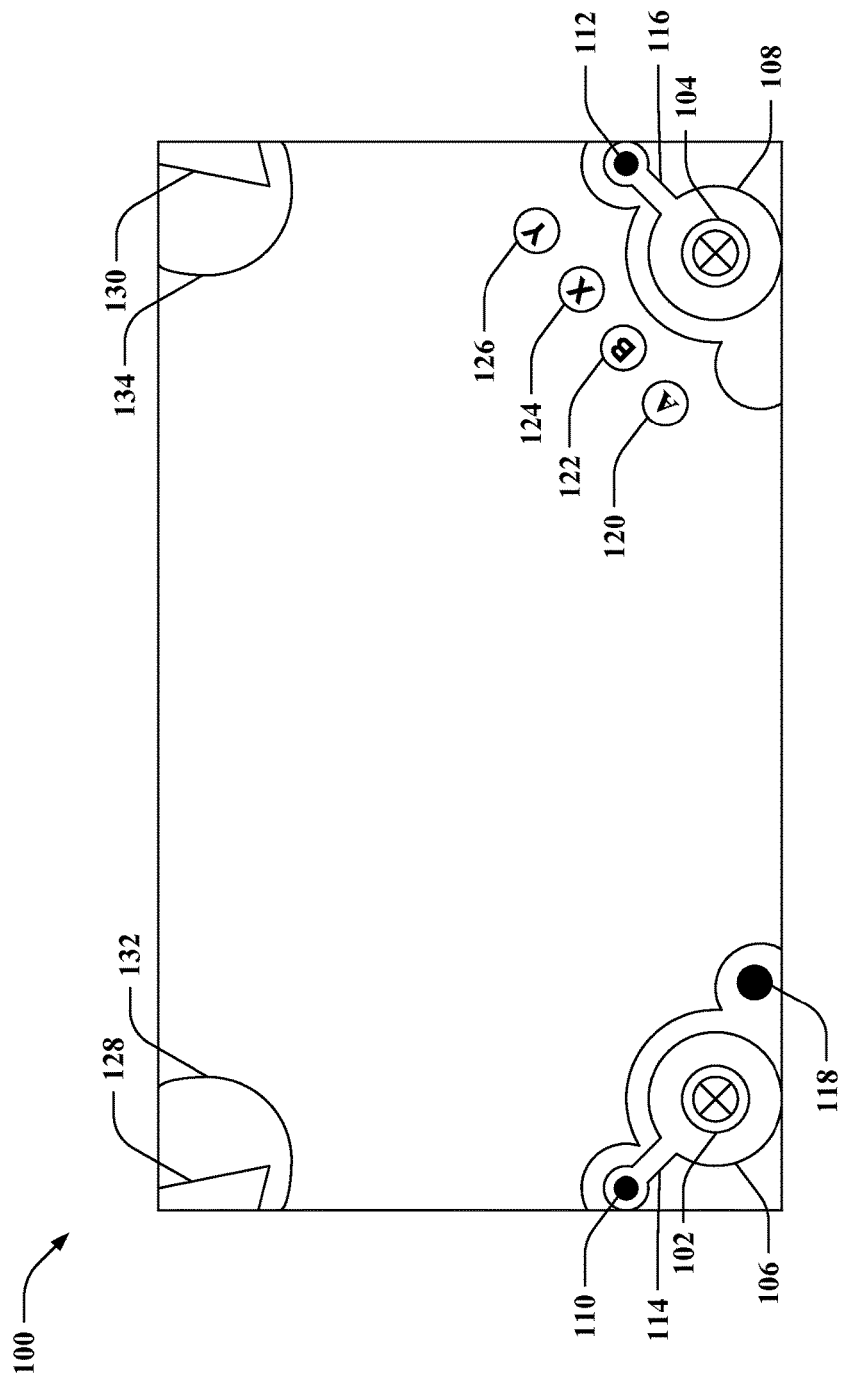
FIG. 1 illustrates an exemplary graphical user interface that can be rendered on a display of a mobile touch-enabled device.

Various technologies pertaining to controlling a game with a mobile touch-enabled device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, a game can be controlled with a mobile touch-enabled device. More particularly, an interaction model designed for the mobile touch-enabled device described herein can provide an increased number of analog and/or discrete inputs that can be utilized to manipulate the game as compared to conventional interaction models employed with mobile touch-enabled devices. Accordingly, in comparison to traditional approaches, the interaction model described herein can enable a user to manipulate a game via a mobile touch-enabled device in a manner that is more similar to manipulating a game via a controller used in conjunction with a video game console.

Referring now to the drawings, FIG. 1 illustrates an exemplary graphical user interface 100 that can be rendered on a display. The graphical user interface 100 can be rendered on a display of a mobile touch-enabled device, for instance. Examples of mobile touch-enabled devices include phones (e.g., smartphones, etc.), handheld computers, tablet computers, and the like.

Further, the graphical user interface 100 can be rendered to enable a user to interact with a game. For example, although not shown, it is to be appreciated that the graphical user interface 100 can include game data (e.g., visual information related to the game); accordingly, the game data can be rendered on at least a portion of the display of the mobile touch-enabled device. By way of illustration, visual indicators included in the exemplary graphical user interface 100 can be rendered on a layer above the game data on the display of the mobile touch-enabled device; however, the claimed subject matter is not so limited. Moreover, inputs represented by visual indicators included in the exemplary graphical user interface 100 can be utilized by the user to manipulate the game data rendered on the display.

The graphical user interface 100 includes various visual indicators that visually represent different analog and discrete inputs. The visual indicators are positioned in the graphical user interface 100 to be located on different respective areas of a display on which the graphical user interface 100 is rendered. Moreover, according to one or more exemplary embodiments, it is contemplated that an area of the display can be reassignable; accordingly, the graphical user interface 100 can include a first visual indicator located on a reassignable area of the display during a first period of time, and a second visual indicator located on the reassignable area of the display during a second period of time. For example, a touch detected within the reassignable area of the display can control different operations during the first period of time compared to the second period of time. According to a further example, different types of inputs (e.g., analog input versus discrete input) can map to touch detected within the reassignable area of the display during the first period of time compared to the second period of time. Following this example, it is contemplated that the different types of inputs can be utilized to control different operations.

According to an example, one or more of the inputs represented by the visual indicators in the graphical user interface 100 can map to touch detected within corresponding areas of the display of the mobile touch-enabled device; thus, detected touch within the corresponding areas of the display can be used to control various operations of the game. Additionally or alternatively, at least one of the inputs represented by a visual indicator in the graphical user interface 100 can map to an output of one or more disparate sensors included in the mobile touch-enabled device; accordingly, the output from the disparate sensor(s) can be used to control various operations of the game. A camera, an accelerometer, a gyroscope, and the like are examples of the disparate sensors that can be included in the mobile touch-enabled device; however, it is to be appreciated that the claimed subject matter is not so limited. By using the disparate sensor(s), more points of control (e.g., in addition to the two thumbs) can be supported.

The visual indicators included in the exemplary graphical user interface 100 are further described below. It is to be appreciated, however, that a graphical user interface that lacks one or more of the visual indicators illustrated herein and/or includes one or more visual indicators that differ from the visual indicators illustrated herein is intended to fall within the scope of the hereto appended claims. As depicted, the exemplary graphical user interface 100 includes two thumbsticks: namely, a left thumbstick 102 and a right thumbstick 104. Further, the left thumbstick 102 is located within a left thumbstick zone 106 and the right thumbstick 104 is located within a right thumbstick zone 108 in the graphical user interface 100. The graphical user interface 100 also includes a left mode selection button 110 and a right mode selection button 112. A left trough 114 is positioned between the left mode selection button 110 and the left thumbstick zone 106, and a right trough 116 is positioned between the right mode selection button 112 and the right thumbstick zone 108. Moreover, the graphical user interface 100 includes a toggle button 118 and four tap buttons (e.g., an A button 120, a B button 122, an X button 124, and a Y button 126). The graphical user interface 100 additionally includes a left trigger button 128, a right trigger button 130, a left bumper 132, and a right bumper 134.

The visual indicators depicted in FIG. 1 are positioned in the graphical user interface 100 to be rendered on respective areas of the display of the mobile touch-enabled device. Accordingly, the left thumbstick 102 (and the left thumbstick zone 106) can be rendered on a left reassignable area of the display, and the right thumbstick 104 (and the right thumbstick zone 108) can be rendered on a right reassignable area of the display. Further, the left mode selection button 110 can be rendered on a left mode selection area of the display, and the right mode selection button 112 can be rendered on a right mode selection area of the display. The left trough 114 can be rendered on a left trough area of the display, and the right trough 116 can be rendered on a right trough area of the display. Moreover, the toggle button 118 can be rendered on a toggle area of the display, the four tap buttons can be rendered on corresponding, respective tap areas of the display, the left trigger button 128 can be rendered on a left trigger area of the display, the right trigger button 130 can be rendered on a right trigger area of the display, the left bumper 132 can be rendered on a left bumper area of the display, and the right bumper 134 can be rendered on a right bumper area of the display.

Moreover, inputs used to control operations in the game represented by the left thumbstick 102, the right thumbstick 104, the left mode selection button 110, the right mode selection button 112, the toggle button 118, the A button 120, the B button 122, the X button 124, and the Y button 126 can map to touch detected within corresponding areas of the display of the mobile touch-enabled device. Further, inputs used to control operations in the game represented by the left trigger button 128 and the right trigger button 130 can map to a measured amount of tilt (e.g., measured angle of tilt) of the mobile touch-enabled device detected from output of a sensor. Moreover, inputs used to control operations in the game represented by the left bumper 132 and the right bumper 134 can map to rotation of the mobile touch-enabled device detected from output of a sensor. According to an example, the sensor utilized to detect the amount of tilt and the sensor utilized to detect the rotation can be the same sensor. Pursuant to another example, different sensors can be employed to detect the amount of tilt and the rotation of the mobile touch-enabled device. In accordance with yet a further example, it is contemplated that more than one sensor can be utilized to detect the amount of tilt and/or the rotation of the mobile touch-enabled device.

Further, a subset of the inputs utilized to control operations in the game are analog inputs and a remainder of the inputs utilized to control operations in the game are discrete inputs. More particularly, the inputs represented by the left thumbstick 102, the right thumbstick 104, the left trigger button 128, and the right trigger button 130 are analog inputs, while a remainder of the inputs can be discrete inputs. An analog input can receive analog input information, which can be a value within a continuous range. Further, a discrete input can receive discrete input information; the discrete input information can be an on or off value, an up, down, left, or right value, or any other discrete value. A discrete input, for instance, can be responsive to a tap of a user.

As noted above, the input represented by the right thumbstick 104 is an analog input that can receive analog input information. According to an example, a user can touch a portion of the right reassignable area of the display on which the right thumbstick 104 is rendered with his right thumb. While continuing to touch the display, the user can move his right thumb within the right reassignable area (e.g., within the right thumbstick zone 108). As the user moves his right thumb within the right reassignable area of the display, the right thumbstick 104 can move within the graphical user interface 100 rendered on the display to provide visual feedback to the user, for instance; however, the claimed subject matter is not so limited. Moreover, following this example, the touch of the user can be detected and mapped to analog input information. The analog input information can vary within a continuous range of values as a function of a location on the display at which the touch is detected (e.g., the analog input information can change within the range of values based on movement of the right thumb on the display, removal of the right thumb from the display, etc.). Moreover, it is contemplated that the input represented by the left thumbstick 102 can be substantially similar to the input represented by the right thumbstick 104.

Further, as described above, the input represented by the A button 120 is an example of a discrete input that can receive discrete input information. Pursuant to an example, whether a user is touching or not touching a tap area of the display on which the A button 120 is rendered can be detected. In accordance with this example, whether or not a touch is detected in the tap area of the display on which the A button 120 is rendered can be mapped to discrete input information. For instance, the input represented by the A button 120 can function as a single press or a press and hold button. In accordance with an illustration, if the input represented by the A button 120 functions as a single press button, then the discrete input information can switch from a first state to a second state (e.g., on to off, off to on, etc.) in response to a detected transition from the user not touching to the user touching the tap area of the display on which the A button 120 is rendered (or alternatively the transition from the user touching to the user not touching such tap area). By way of yet another illustration, if the input represented by the A button 120 functions as a press and hold button, then the discrete input information can switch from a first state to a second state (e.g., off to on, on to off, etc.) in response to a detected transition from the user not touching to the user touching the tap area of the display on which the A button 120 is rendered, and can switch back from the second state to the first state (e.g., on to off, off to on, etc.) in response to a detected transition from the user touching to the user not touching the tap area of the display on which the A button 120 is rendered. Further, it is to be appreciated that inputs represented by the B button 122, the X button 124, and the Y button 126 can be substantially similar to the input represented by the A button 120.

Figure 2:
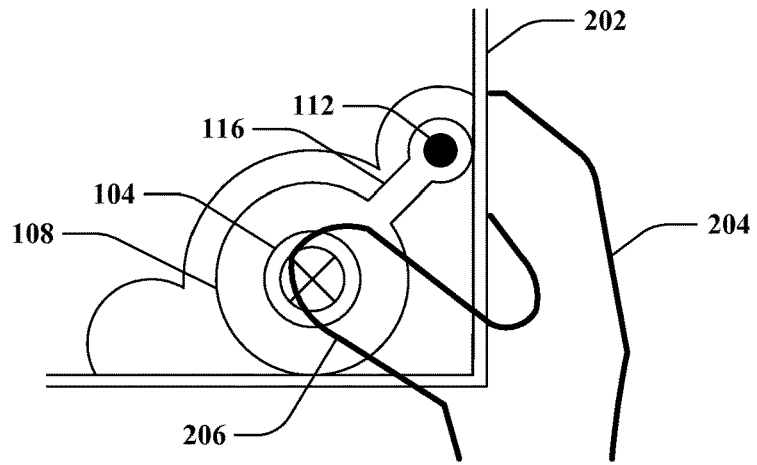
FIGS. 2-4 illustrate an exemplary user interaction with a mobile touch-enabled device to switch a mode of input represented by a thumbstick, which is included within an exemplary graphical user interface.
Figure 3:
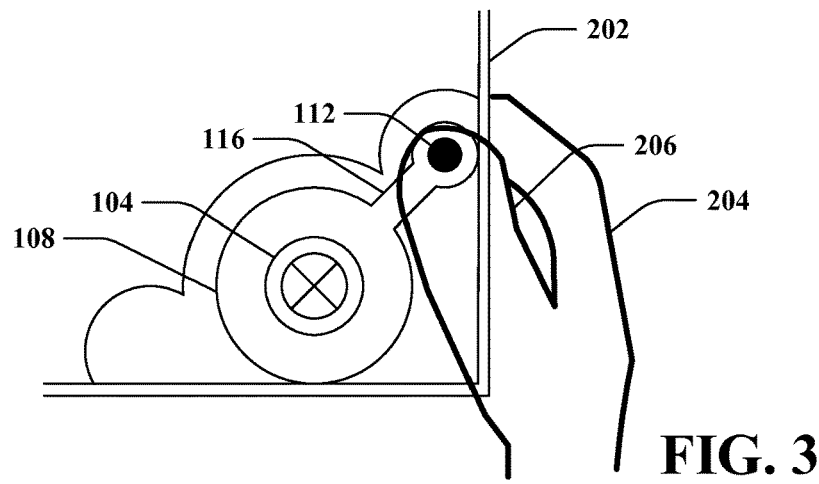
Figure 4:
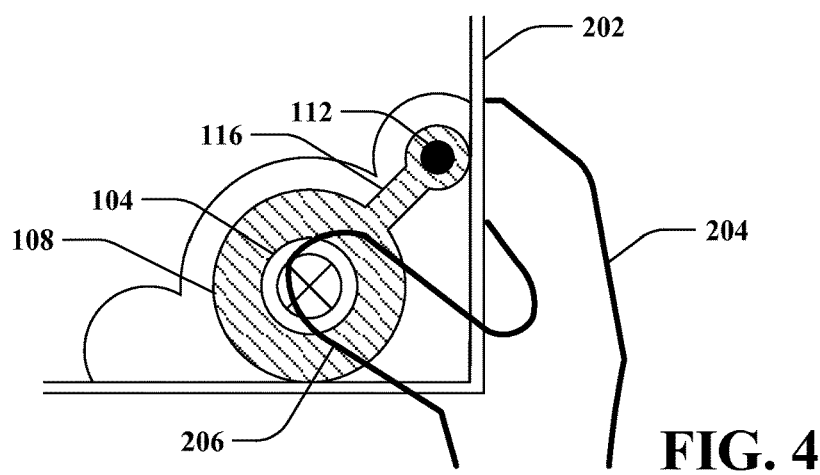

With reference to FIGS. 2-4, illustrated is an exemplary user interaction with a mobile touch-enabled device 202 to switch a mode of the input represented by the right thumbstick 104. In this exemplary user interaction, the mobile touch-enabled device 202 is held in a right hand 204 of a user. Although not shown, it is contemplated that the mobile touch-enabled device 202 can additionally or alternatively be held in a left hand of the user. For illustration purposes, FIGS. 2-4 show a portion of the graphical user interface 100 of FIG. 1 being rendered on a portion of a display of the mobile touch-enabled device 202; yet, it is contemplated that a remainder of the graphical user interface 100 of FIG. 1 can be rendered on a remainder of the display of the mobile touch-enabled device 202, which is not depicted. The exemplary user interaction illustrates a right thumb 206 of the right hand 204 of the user touching various areas of the display of the mobile touch-enabled device 202 to switch the mode of the input represented by the right thumbstick 104. For instance, the exemplary user interaction with the mobile touch-enabled device 202 shown in FIGS. 2-4 can simulate interacting with a depressible analog thumbstick on a conventional controller for a video game console. Further, different operations in a game can be controlled by the input represented by the right thumbstick 104 as a function of the mode (e.g., whether the right thumbstick 104 is represented as being at a default height in a thumbstick up mode or a depressed height in a thumbstick down mode). Moreover, it is contemplated that the user can similarly interact with the input represented by the left thumbstick 102 of FIG. 1 (e.g., using a left thumb of a left hand).

In the exemplary user interaction, FIGS. 2-4 show the right thumbstick 104 and the right thumbstick zone 108 being rendered on a right reassignable area of the display of the mobile touch-enabled device 202. Moreover, the right mode selection button 112 is rendered on a right mode selection area of the display of the mobile touch-enabled device 202. The right reassignable area of the display and the right mode selection area of the display are non-overlapping. Further, the right trough 116 is rendered on a right trough area of the display of the mobile touch-enabled device 202. According to the illustrated example, the right trough area is between the right reassignable area and the right mode selection area. It is to be appreciated, however, that the exemplary user interaction is presented for illustration purposes, and the claimed subject matter is not so limited.

Turning to FIG. 2, the right thumbstick 104 is represented as being at a default height on the display of the mobile touch-enabled device 202 (e.g., the input represented by the right thumbstick 104 being in a thumbstick up mode). Further, the right thumb 206 of the user is touching the right reassignable area of the display, on which the right thumbstick 104 and the right thumbstick zone 108 are rendered. The mobile touch-enabled device 202 can detect the touch of the right thumb 206 within the right reassignable area of the display (e.g., a first touch can be detected). Moreover, a first operation in a game can be controlled in response to the detected touch of the right thumb 206 within the right reassignable area of the display when the right thumbstick 104 is represented as being at the default height as illustrated in FIG. 2. For instance, the detected touch can map to analog input information; thus, analog input information can be received via the right reassignable area of the display with the right thumbstick 104 rendered thereupon.

FIG. 3 again illustrates the right thumbstick 104 being at the default height on the display of the mobile touch-enabled device 202. Moreover, the right thumb 206 of the user is touching the right mode selection area of the display, on which the right mode selection button 112 is rendered. According to an example, the right thumb 206 of the user may have been dragged from the right reassignable area of the display as shown in FIG. 2 to the right mode selection area of the display as shown in FIG. 3 (e.g., without discontinuity of contact between the right thumb 206 and the display of the mobile touch-enabled device 202, without discontinuity of contact from a beginning of the first touch, etc.). By way of another example, the right thumb 206 of the user may have been removed from being in contact with the display subsequent to touching the right reassignable area of the display as shown in FIG. 2, and thereafter placed in contact with the right mode selection area of the display as shown in FIG. 3 (e.g., discontinuity of contact after the first touch).

Moreover, the right thumb 206 of the user can be dragged from the right mode selection area of the display as shown in FIG. 3 to the right reassignable area (e.g., without discontinuity of contact between the right thumb 206 and the display of the mobile touch-enabled device 202). The mobile touch-enabled device 202 can detect such a touch (e.g., a second touch). Thus, the second touch detected is a drag from the right mode selection area of the display to the right reassignable area of the display. According to an example, the drag of the second touch can be detected to pass through at least a portion of the right trough area; however, the claimed subject matter is not so limited. Further, the mobile touch-enabled device 202 can switch the mode of the input represented by the right thumbstick 104 upon detecting the second touch (e.g., switch the input represented by the right thumbstick 104 to be in a thumbstick down mode).

As depicted in FIG. 4, the right thumbstick 104 is represented as being at a depressed height. According to the illustrated example, at least a portion of a visual indicator rendered on the right reassignable area of the display is changed to represent the right thumbstick 104 being switched to the depressed height in response to detecting the second touch (e.g., the aforementioned drag). By way of example, a first visual indicator can be rendered on the right reassignable area of the display when the right thumbstick 104 is represented as being at the default height (e.g., as shown in FIGS. 2 and 3), and a second visual indicator can be rendered on the right reassignable area of the display when the right thumbstick 104 is represented as being at the depressed height (e.g., as shown in FIG. 4). Following this example, at least a portion of the first visual indicator and the second visual indicator differ.

FIG. 4 shows the right thumb 206 of the user touching the right reassignable area of the display of the mobile device. The mobile touch-enabled device 202 can detect the touch of the right thumb 206 within the right reassignable area of the display (e.g., a third touch) after the right thumb 206 is dragged from the right mode selection area to the right reassignable area of the display without discontinuity of contact. Thus, the second touch and the third touch are detected by the mobile touch-enabled device without detecting discontinuity of contact. Further, a second operation in the game can be controlled in response to the third touch detected within the right reassignable area of the display when the right thumbstick 104 is represented as being at the depressed height as illustrated in FIG. 4.

Moreover, the third touch can be detected to be discontinued (e.g., the right thumb 206 of the user touching the right reassignable area of the display as shown in FIG. 4 can be detected to be released from the display). Upon detecting the discontinuation of the third touch, the mobile touch-enabled device 202 can switch the mode of the input represented by the right thumbstick 104 back to the mode depicted in FIG. 2 (e.g., switch the input represented by the right thumbstick 104 to be in a thumbstick up mode). Accordingly, the right thumbstick 104 can mimic being spring loaded, for instance (e.g., simulate automatically popping up upon being released).

Thereafter, if the mobile touch-enabled device 202 detects the right thumb 206 of the user touching the right reassignable area of the display (e.g., a fourth touch) after discontinuation of the third touch, then the first operation in the game can again be controlled in response to the fourth touch. The fourth touch can be detected within the right reassignable area of the display when the right thumbstick 104 is represented as being at the default height as shown in FIG. 2.

Referring again to FIG. 1, the input represented by the toggle button 118 can switch the type of input that maps to touch detected within the left reassignable area of the display (e.g., on which the left thumbstick 102 and the left thumbstick zone 106 are rendered in the graphical user interface 100). According to an example, a touch within the toggle area of the display (e.g., on which the toggle button 118 is rendered) can be detected when the left thumbstick 102 is rendered on the left reassignable area of the display (e.g., as shown in FIG. 1). The touch within the toggle area of the display can cause the type of input that maps to touch detected within the left reassignable area of the display to switch from an analog input to a discrete input.

Figure 5:
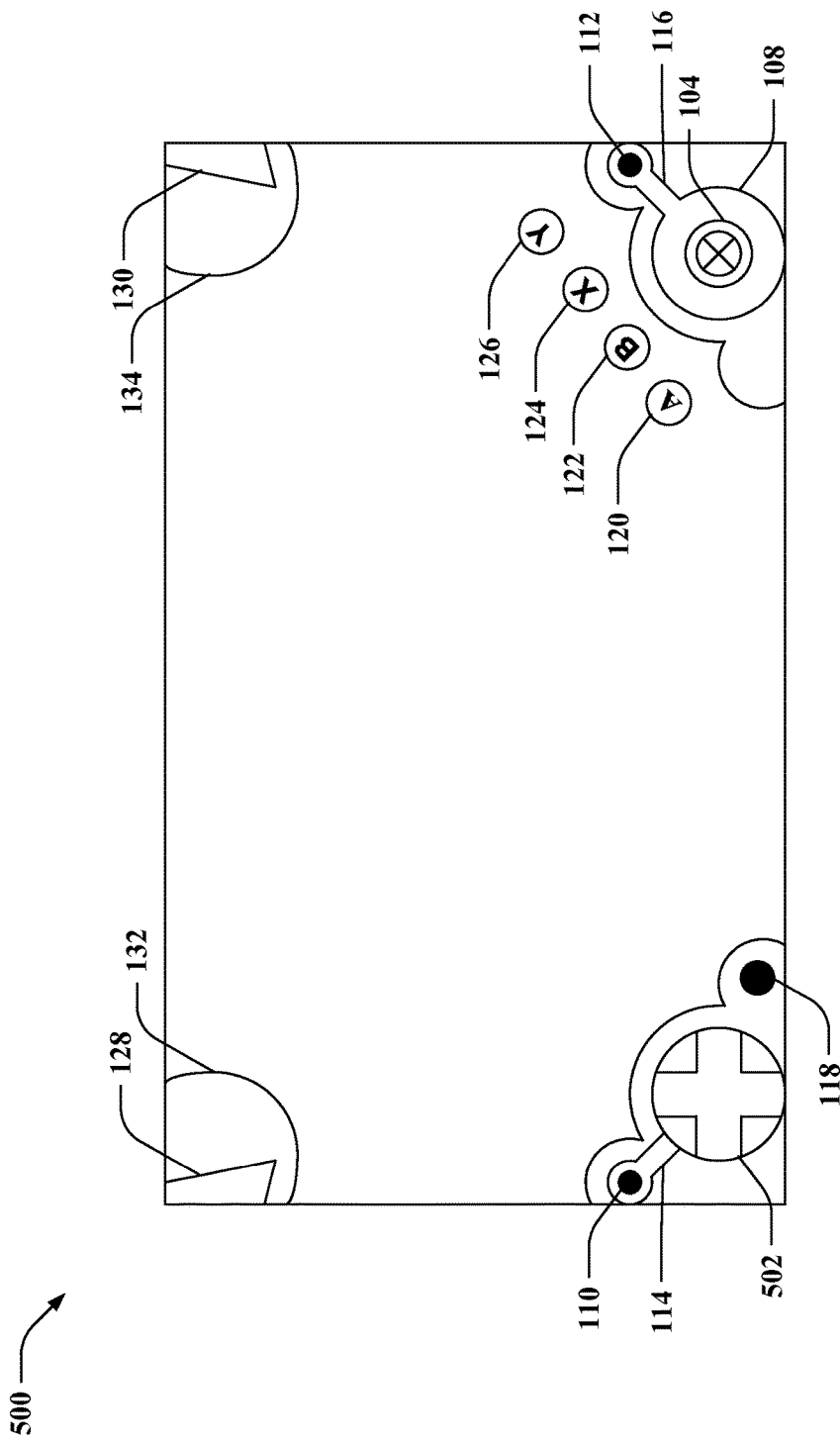
FIG. 5 illustrates another exemplary graphical user interface that can be rendered on the display of the mobile touch-enabled device.

With reference to FIG. 5, illustrated is another exemplary graphical user interface 500 that can be rendered on the display of the mobile touch-enabled device. The mobile touch-enabled device can switch from rendering the graphical user interface 100 of FIG. 1 to rendering the graphical user interface 500 on the display when the touch within the toggle area of the display as described above is detected. Thus, the mobile touch-enabled device can switch from rendering the left thumbstick 102 of FIG. 1 (e.g., included in the graphical user interface 100 of FIG. 1) to rendering a directional pad 502 on the left reassignable area of the display upon detecting the touch within the toggle area of the display. Further, when the directional pad 502 is rendered on the left reassignable area of the display, the left reassignable area of the display can be configured as a discrete input.

According to an example, if a disparate touch within the toggle area of the display (e.g., on which the toggle button 118 is rendered) is detected when the directional pad 502 is rendered on the left reassignable area of the display (e.g., as shown in FIG. 5), then the mobile touch-enabled device can switch from rendering the directional pad 502 to rendering the left thumbstick 102 of FIG. 1 on the left reassignable area of the display. Hence, the graphical user interface 100 of FIG. 1 can again be rendered on the display of the mobile touch-enabled device. Accordingly, following this example, the left reassignable area of the display can be configured as an analog input when the left thumbstick 102 of FIG. 1 is rendered thereupon. It is thus contemplated that the input represented by the toggle button 118 can cause the left reassignable area of the display of the mobile touch-enabled device to switch between being an analog input (e.g., receiving analog input information) and a discrete input (e.g., receiving discrete input information). Additionally or alternatively, although not shown, it is to be appreciated that the right reassignable area of the display can similarly be associated with an input similar to the input represented by the toggle button 118.

Pursuant to an example, it is contemplated that the input represented by the left mode selection button 110 can be disabled when the directional pad 502 is rendered on the display. According to an alternative example, the input represented by the left mode selection button 110 can be enabled when the directional pad 502 is rendered on the display. Following this example, a touch detected within the left mode selection area of the display when the directional pad 502 is rendered on the display can cause the left reassignable area of the display of the mobile touch-enabled device to switch from rendering the directional pad 502 to rendering the left thumbstick 102 of FIG. 1 on the left reassignable area of the display (e.g., similar to detecting a touch within the toggle area of the display as set forth above).

According to another example, a touch (e.g., a drag similar to the drag described above in relation to FIGS. 3 and 4) from the left mode selection area of the display to the left reassignable area of the display can be detected. Upon detecting such a touch, the mobile touch-enabled device can switch from rendering the directional pad 502 on the reassignable area of the display to rendering the left thumbstick 102 of FIG. 1 on the reassignable area of the display (e.g., the graphical user interface 100 of FIG. 1 can be rendered on the display). Moreover, following this example, it is to be appreciated that the left thumbstick 102 can be directly represented as being at the depressed height (e.g., similar to the example shown in FIG. 4). Accordingly, similar to the example of FIG. 4, an operation in the game can be controlled with the left thumbstick 102 of FIG. 1 represented as being at the depressed height in response to a subsequent touch detected within the left reassignable area of the display while the touch continues to be detected (e.g., without discontinuity of contact starting at a beginning of the drag). Further, after the touch is detected to be discontinued, then a different operation in the game can be controlled with the left thumbstick 102 of FIG. 1 represented as being at the default height in response to a further subsequent touch within the left reassignable area of the display.

With reference to FIGS. 6-9, illustrated are various exemplary orientations of the mobile touch-enabled device 202 that can be utilized to manipulate operations in a game rendered on a display of the mobile touch-enabled device 202. According to an example, various inputs used to control operations in the game can map to measured amounts of tilt of the mobile touch-enabled device 202. For instance, the amount of tilt of the mobile touch-enabled device 202 can be measured by a sensor (not shown) included in the mobile touch-enabled device 202.

Figure 6:
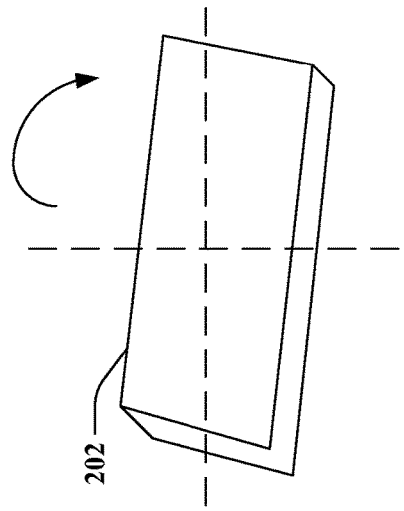
FIGS. 6-9 illustrate various exemplary orientations of the mobile touch-enabled device that can be utilized to manipulate operations in a game rendered on the display of the mobile touch-enabled device.

FIG. 6 depicts the mobile touch-enabled device 202 in a rest pose.

Figure 7:
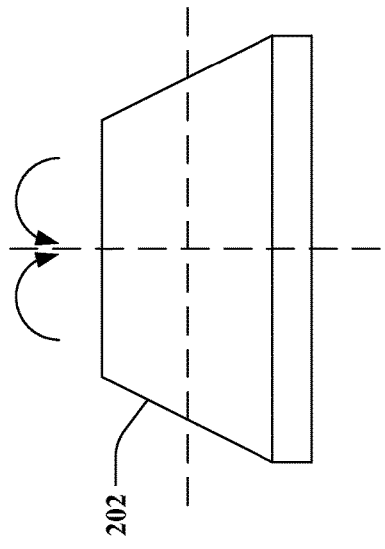
Figure 8:
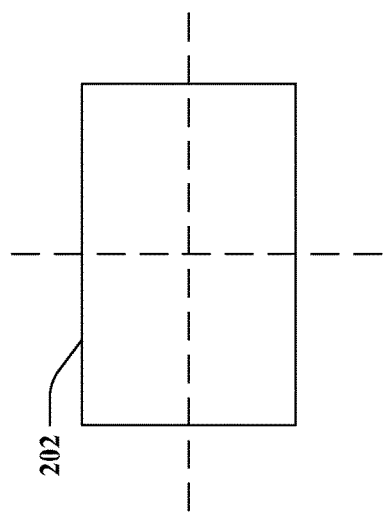
Figure 9:
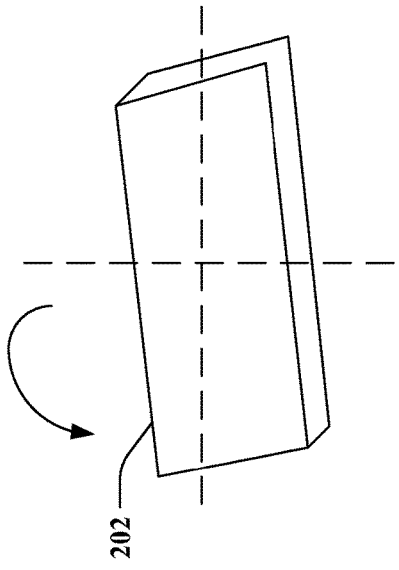

Further, a surface of the display of the mobile touch-enabled device 202 in the rest pose can define a predetermined plane referred to in FIGS. 7-9. It is to be appreciated that the rest pose of the mobile touch-enabled device 202 can be identified in substantially any manner. According to various illustrations, the rest pose can be identified as being a preset orientation of the mobile touch-enabled device 202, an orientation at a time of powering on the mobile touch-enabled device 202, an orientation at a time of starting a game, an orientation of the mobile touch-enabled device 202 after a predetermined amount of time has lapsed without tilting the mobile touch-enabled device 202, or the like. Yet, it is to be appreciated that the claimed subject matter contemplates identifying the rest pose in substantially any other manner.

The amount of the tilt of the mobile touch-enabled device 202 relative to the predetermined plane can be measured. Moreover, an operation in the game can be controlled as a function of the amount of the tilt of the mobile touch-enabled device 202. It is contemplated that the amount of the tilt of the mobile touch-enabled device 202 can map to analog input information for the game. Further, a level of the analog input information for the game can remain constant when the amount of the tilt of the mobile touch-enabled device 202 remains constant relative to the predetermined plane.

FIG. 7 shows a top right corner of the mobile touch-enabled device 202 being tilted relative to the predetermined plane defined by the rest pose. According to the depicted example, the input represented by the right trigger button 130 included in the exemplary graphical user interface 100 of FIG. 1 can map to the amount of the tilt of the mobile touch-enabled device 202 as measured relative to the predetermined plane. Thus, the upper right corner of the mobile touch-enabled device 202 can be tilted downwards to varying orientations by a user to activate the input represented by the right trigger button 130 of FIG. 1. Accordingly, the amount of tilting of the upper right corner of the mobile touch-enabled device 202 can mimic squeezing a trigger of a conventional controller utilized with a video game console with varying degrees of pressure. By way of further example, it is contemplated that depression of the right trigger button 130 of FIG. 1 rendered on the display of the mobile touch-enabled device 202 can be depicted as a function of the amount of the tilt as measured (e.g., visual feedback can be supplied to the user).

Similarly, FIG. 8 depicts a top left corner of the mobile touch-enabled device 202 being tilted relative to the predetermined plane defined by the rest pose. It is to be appreciated that the input represented by the left trigger button 128 of FIG. 1 can be manipulated as a function of the amount of the tilt of the top left corner in a substantially similar manner as compared to the example of FIG. 7 described above. Moreover, FIG. 9 shows both the top left corner and the top right corner of the mobile touch-enabled device 202 being tilted together relative to the predetermined plane defined by the rest pose. Pursuant to this example, both the input represented by the left trigger button 128 of FIG. 1 and the input represented by the right trigger button 130 of FIG. 1 can be simultaneously manipulated in accordance with the example described above with respect to FIG. 7.

Turning to FIGS. 10-12, illustrated are additional exemplary orientations of the mobile touch-enabled device 202 that can be utilized to manipulate operations in the game rendered on a display of the mobile touch-enabled device 202. For instance, the mobile touch-enabled device 202 can be moved from the rest pose depicted in FIG. 6 to the orientations shown in FIGS. 10-12; such movement can be mapped to one or more inputs used to control operations in the game. As illustrated, FIGS. 10 and 11 depict the mobile touch-enabled device 202 being rotated in a plane defined by a surface of a display of the mobile touch-enabled device 202 relative to the rest pose. Further, FIG. 12 shows the mobile touch-enabled device 202 being moved downwards in the plane defined by the surface of the display of the mobile touch-enabled device 202 relative to the rest pose.

According to an example, whether the mobile touch-enabled device 202 is rotated in the plane defined by the surface of the display can be detected. Moreover, an operation in the game can be controlled whether the mobile touch-enabled device 202 is rotated as detected. Further, whether the mobile touch-enabled device 202 is rotated can be mapped to discrete input information for the game.

For instance, a clockwise rotation of the mobile touch-enabled device 202 as shown in FIG. 10 (e.g., compared to the orientation from FIG. 6) or a counterclockwise rotation of the mobile touch-enabled device 202 as shown in FIG. 11 (e.g., compared to the orientation from FIG. 6) can be detected. By way of illustration, whether a clockwise rotation is detected can map to the input represented by the right bumper 134 of FIG. 1 (e.g., a discrete input), and whether a counterclockwise rotation is detected can map to the input represented by the left bumper 132 of FIG. 1 (e.g., a discrete input). Pursuant to an illustration, the clockwise rotation or the counterclockwise rotation can be caused by the user tapping a top right corner or a top left corner of the mobile touch-enabled device 202; however, it is to be appreciated that such a tap need not be employed to rotate the mobile touch-enabled device 202.

Pursuant to a further example, whether the mobile touch-enabled device 202 is moved downwards in the plane defined by the surface of the display as depicted in FIG. 12 can be detected. Following this example, if the mobile touch-enabled device 202 is detected to have been moved downwards, then both the input represented by the left bumper 132 of FIG. 1 and the input represented by the right bumper 134 of FIG. 1 can be activated. Moreover, although not shown, it is further contemplated that movement of the mobile touch-enabled device 202 upwards can additionally or alternatively be detected and utilized in a similar manner as compared to the aforementioned discussion related to the downwards movement.

Figure 13:
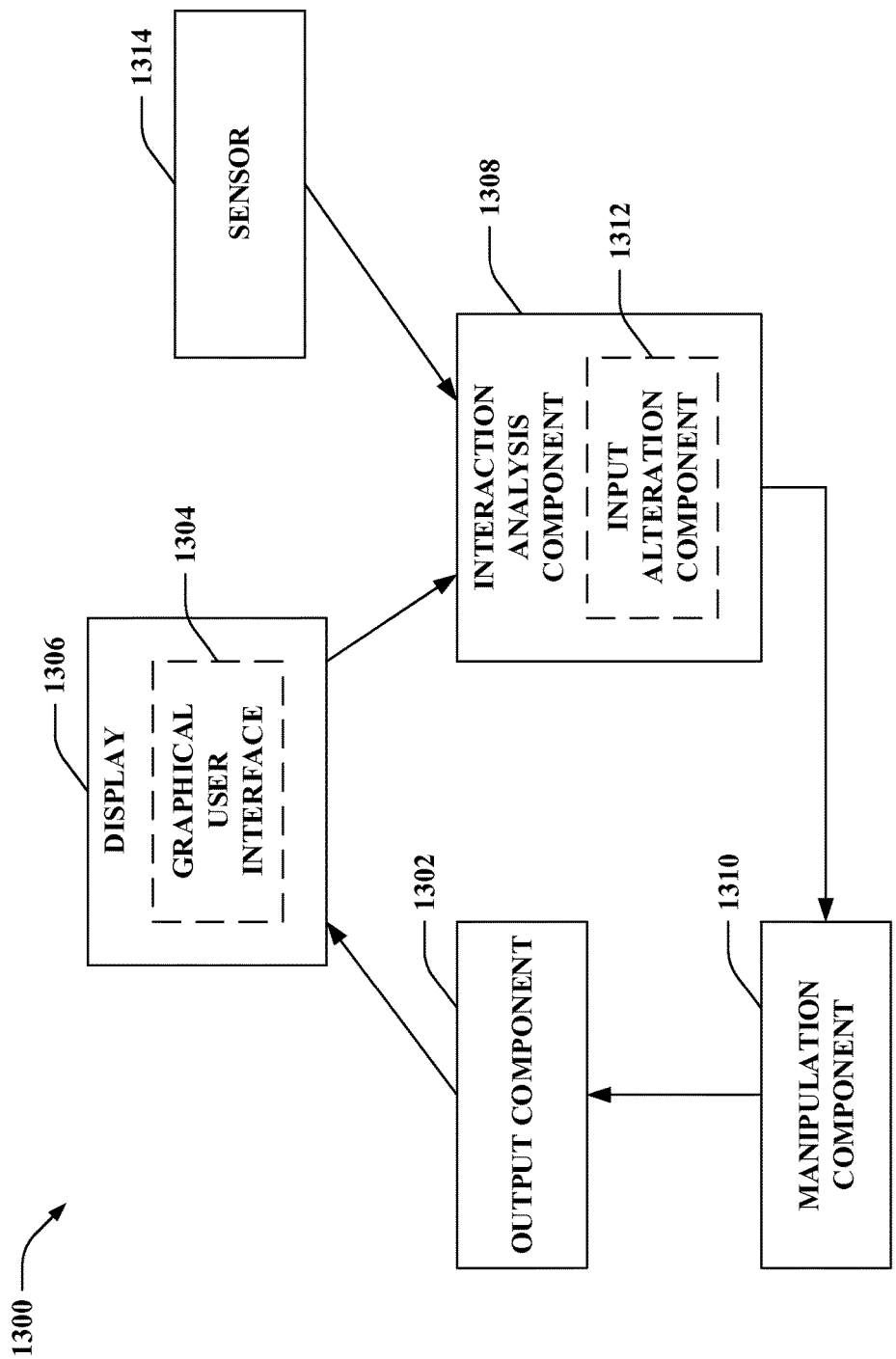
FIG. 13 illustrates a functional block diagram of an exemplary system 1300 that controls a game executed by a mobile touch-enabled device.

Now referring to FIG. 13, illustrated is an exemplary system 1300 that controls a game executed by a mobile touch-enabled device (e.g., the mobile touch-enabled device 202 of FIG. 2). The system 1300 includes an output component 1302 that renders a graphical user interface 1304 (e.g., the graphical user interface 100 of FIG. 1, the graphical user interface 500 of FIG. 5, etc.) on a display 1306 of the mobile touch-enabled device. For instance, the graphical user interface 1304 rendered by the output component 1302 can include game data. According to an illustration, the game data can be generated by the output component 1302; however, it is further contemplated that the game data can be generated by a disparate component (not shown).

Moreover, the system 1300 includes an interaction analysis component 1308 that can receive touch related data from the display 1306. The interaction analysis component 1308 can be configured to detect the various touches described herein based upon the touch related data received from the display 1306. Moreover, the interaction component 1308 can be the various inputs represented by the visual indicators included in the graphical user interface 1304 as set forth herein.

The system 1300 further includes a manipulation component 1310 that can control the graphical user interface 1304 rendered by the output component 1302. More particularly, the manipulation component 1310 can employ input information (e.g., analog input information, discrete input information, etc.) received from the interaction analysis component 1308 to control corresponding operations in a game, which can cause the game data rendered as part of the graphical user interface 1304 (or outputted by the output component 1302 in substantially any other manner) to be changed.

According to an example, the output component 1302 can render at least a thumbstick (e.g., the left thumbstick 102 of FIG. 1, the right thumbstick 104 of FIG. 1, etc.) on a reassignable area of the display 1306 and a mode selection button (e.g., the left mode selection button 110 of FIG. 1, the right mode selection button 112, etc.) on a mode selection area of the display 1306. Further, the reassignable area and the mode selection area of the display 1306 are non-overlapping. Following this example, the interaction analysis component 1308 can be configured to detect a drag from the mode selection area of the display 1306 to the reassignable area of the display 1306. Moreover, the interaction analysis component 1308 can be configured to detect a touch within the reassignable area of the display 1306.

Further, the manipulation component 1310 can control a first operation in the game in response to the touch detected within the reassignable area of the display 1306 when the drag (e.g., from the mode selection area of the display 1306 to the reassignable area of the display 1306) and the touch (e.g., within the reassignable area of the display 1306) are detected without discontinuity of contact by the interaction analysis component 1308. The first operation in the game can be controlled based on the touch detected within the reassignable area of the display 1306 while the thumbstick rendered on the display by the output component 1302 is represented as being at a depressed height. Thus, the first operation in the game can be an operation that can typically be performed by moving an analog thumbstick while depressed on a conventional controller utilized with a video game console. According to an illustration, the first operation in the game that can be controlled as described above can be a crouch operation in a first person shooter or roll playing game (RPG) type of game; however, the claimed subject matter is not so limited.

Moreover, the manipulation component 1310 can otherwise control a second operation in the game when the thumbstick is rendered on the display 1306 by the output component 1302 (e.g., when the drag and touch within the reassignable area are not discontinuously detected). In such a scenario, the thumbstick rendered on the display 1306 by the output component 1302 is represented as being at a default height. The second operation in the game can be controlled in response to the touch detected within the reassignable area of the display 1306 by the interaction analysis component 1308. For instance, the second operation in the game can be an operation that can typically be performed by moving an analog thumbstick (e.g., without being depressed) on a convention controller utilized with a video game console. By way of illustration, the second operation in the game that can be controlled as described above can be a walking or running operation in a first person shooter or RPG type of game; yet, the claimed subject matter is not limited to the foregoing illustration.

In various exemplary embodiments, the interaction analysis component 1308 can optionally include an input alteration component 1312. According to such exemplary embodiments, the output component 1302 can further render a toggle button (e.g., the toggle button 118 of FIG. 1) on a toggle area of the display 1306. Additionally, the interaction analysis component 1308 can further be configured to detect a touch within the toggle area of the display 1306. Moreover, the input alteration component 1312 can switch between the touch detected within the reassignable area of the display 1306 mapping to analog input information for the game and mapping to discrete input information for the game in response to the touch detected within the toggle area of the display 1306. Hence, the output component 1302 can render the thumbstick on the reassignable area of the display 1306 when mapped to the analog input information and can render a directional pad (e.g., the directional pad 502 of FIG. 5) on the reassignable area of the display when mapped to the discrete input information. Further, the manipulation 1310 can control a third operation in the game in response to the touch detected within the reassignable area of the display 1306 by the interaction analysis component 1308 when mapped to the discrete input information.

According to other exemplary embodiments, the system 1300 can optionally include a sensor 1314 that can supply data to the interaction analysis component 1308. The sensor 1314, for example, can be a gyroscope, an accelerometer, a camera, or the like. Moreover, it is contemplated that the system 1300 can optionally include a plurality of sensors. It is to be appreciated that the sensor 1314 can be included in the mobile touch-enabled device.

By way of illustration, the interaction analysis component 1308 can use the data received from the sensor 1314 to measure a degree of tilt of the mobile touch-enabled device relative to a predetermined plane (e.g., as depicted in FIGS. 6-9). The predetermined plane can be set based upon a rest pose of the mobile touch-enabled device. Further, the interaction analysis component 1308 can use the data received from the sensor 1314 to detect whether the mobile touch-enabled device is rotated in a plane defined by a surface of the display 1306 (e.g., as depicted in FIGS. 10-12). The manipulation component 1310 can control an operation in the game in response to the degree of the tilt of the mobile device and a disparate operation in the game in response to whether the mobile touch-enabled device is rotated.

In accordance with yet another example, the sensor 1314 can be a camera coupled with the mobile touch-enabled device (e.g., incorporated into, etc.). Following this example, the interaction analysis component 1308 can receive a series of images from the camera. Further, the interaction analysis component 1308 can detect a gesture of a user from the series of images received from the camera (e.g., perform signal processing on the series of images, etc.). Moreover, the manipulation component 1310 can control an operation in the game in response to the gesture of the user detected by the interaction analysis component 1308. By way of illustration, the gesture can be movement of a head of the user (e.g., up, down, left, or right, etc.), a facial gesture (e.g., micro gesture such as gritting teeth, blinking, opening or closing a mouth, etc.), a hand gesture, or the like. By way of further example, it is contemplated that different gestures detected by the interaction analysis component 1308 can be utilized to respectively control different operations.

Pursuant to yet another example, the output component 1302 can vibrate the mobile touch-enabled device to provide force feedback related to the control of the game. According to an illustration, referring to the exemplary user interaction described in FIGS. 2-4, upon detecting the discontinuation of the third touch, the output component 1302 can vibrate the mobile touch-enabled device to provide haptic feedback that signifies that the thumbstick has been switched back to the default height; however, it is to be appreciated that the claimed subject matter is not limited to the foregoing example of haptic feedback, and it is contemplated that haptic feedback responsive to substantially any other user interaction additionally or alternatively can be provided by the output component 1302.

Figure 14:
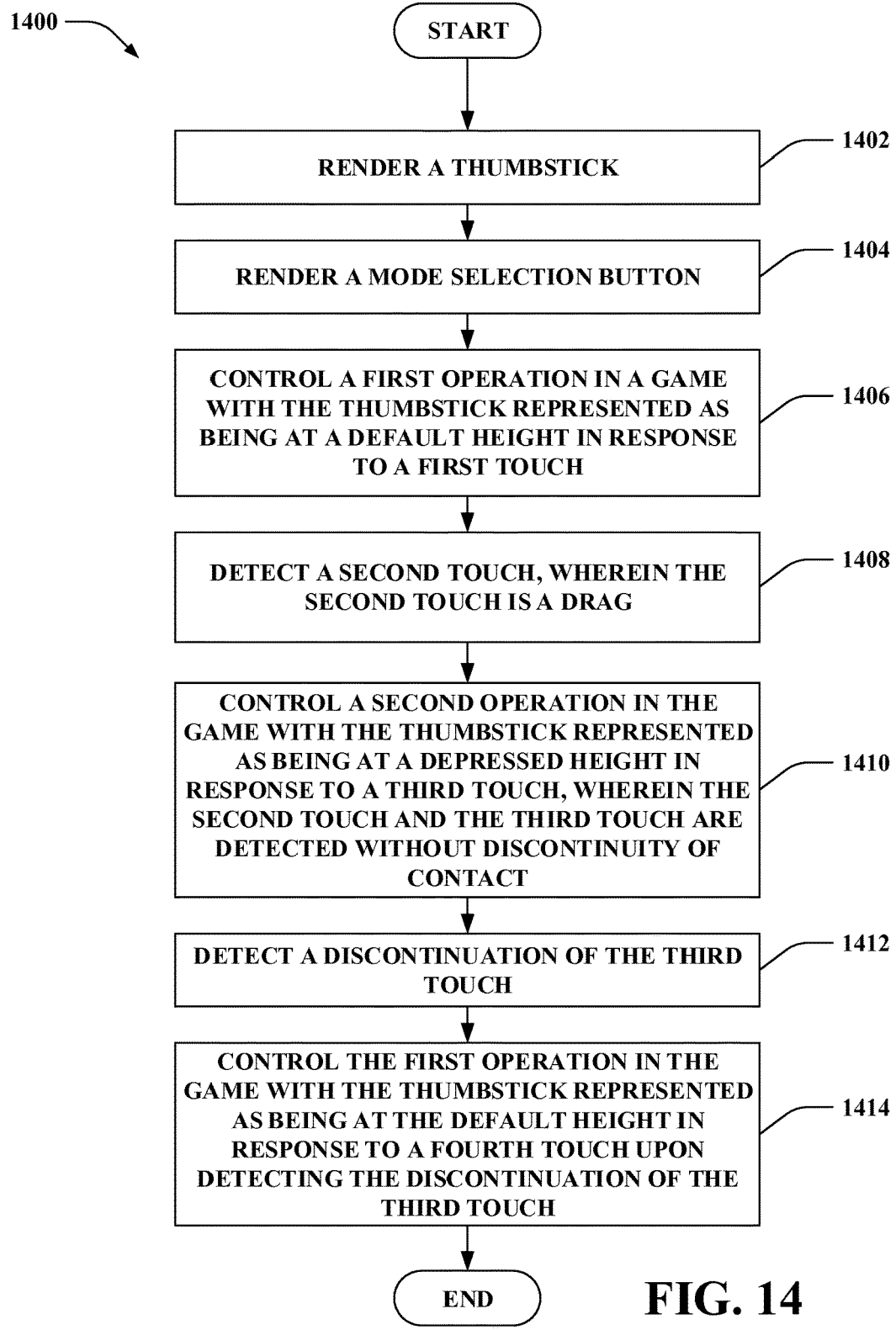
FIG. 14 is a flow diagram that illustrates an exemplary methodology for controlling a game with a mobile touch-enabled device.
Figure 15:
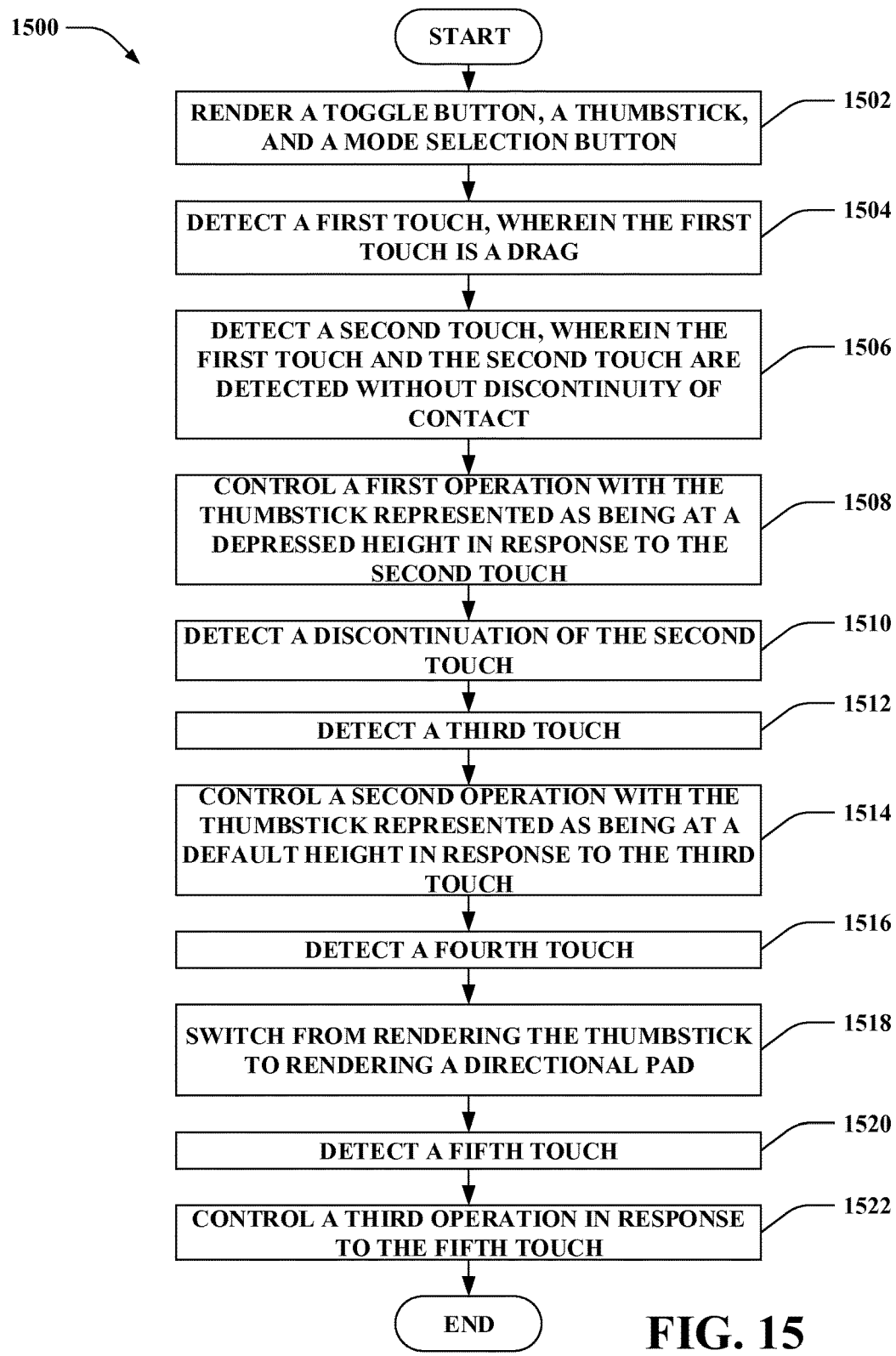
FIG. 15 is a flow diagram that illustrates an exemplary methodology for varying an input for a game receivable via a reassignable area of a display of a mobile touch-enabled device.

FIGS. 14-15 illustrate exemplary methodologies relating to controlling a game with a mobile touch-enabled device. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 14 illustrates a methodology 1400 for controlling a game with a mobile touch-enabled device. At 1402, a thumbstick can be rendered on a reassignable area of a display of the mobile touch-enabled device. At 1404, a mode selection button can be rendered on a mode selection area of the display of the mobile touch-enabled device. Further, the reassignable area and the mode selection area are non-overlapping. At 1406, a first operation in the game can be controlled with the thumbstick represented as being at a default height in response to a first touch detected within the reassignable area of the display.

At 1408, a second touch can be detected. The second touch can be a drag from the mode selection area of the display to the reassignable area of the display. At 1410, a second operation in the game can be controlled with the thumbstick represented as being at a depressed height in response to a third touch detected within the reassignable area of the display. Moreover, the second touch and the third touch are detected without discontinuity of contact (e.g., continuous contact detected from a beginning of the second touch until an end of the third touch). For instance, the second touch and the third touch can be a single touch of the display without a release of the display. At 1412, a discontinuation of the third touch can be detected. At 1414, the first operation in the game can be controlled with the thumbstick represented as being at the default height in response to a fourth touch detected within the reassignable area of the display upon detecting the discontinuation of the third touch.

Turning to FIG. 15, illustrated is a methodology 1500 for varying an input for a game receivable via a reassignable area of a display of a mobile touch-enabled device. At 1502, a toggle button, a thumbstick, and a mode selection button can be rendered on the display of the mobile touch-enabled device. The toggle button can be rendered on a toggle area of the display of the mobile touch-enabled device. Further, the thumbstick can be rendered on the reassignable area of the display of the mobile touch-enabled device. Moreover, the mode selection button can be rendered on a mode selection area of the display of the mobile touch-enabled device, where the mode selection area of the display and the reassignable area of the display are non-overlapping.

At 1504, a first touch can be detected. The first touch can be a drag from the mode selection area of the display to the reassignable area of the display. At 1506, a second touch can be detected within the reassignable area of the display. Further, the first touch and the second touch are detected without discontinuity of contact. At 1508, a first operation in the game can be controlled with the thumbstick represented as being at a depressed height in response to the second touch detected within the reassignable area of the display.

At 1510, a discontinuation of the second touch can be detected (e.g., a thumb of a user can be detected to be released from the display). At 1512, a third touch can be detected within the reassignable area of the display after detecting the discontinuation of the second touch. At 1514, a second operation in the game can be controlled with the thumbstick represented as being at a default height in response to the third touch detected within the reassignable area of the display.

At 1516, a fourth touch can be detected within the toggle area of the display when the thumbstick is rendered on the reassignable area of the display. At 1518, a switch from rendering the thumbstick to rendering a directional pad on the reassignable area of the display can be effectuated in response to the fourth touch detected within the toggle area of the display. At 1520, a fifth touch can be detected within the reassignable area of the display with the directional pad rendered on the reassignable area of the display. At 1522, a third operation in the game can be controlled in response to the fifth touch detected within the reassignable area of the display.

Figure 16:
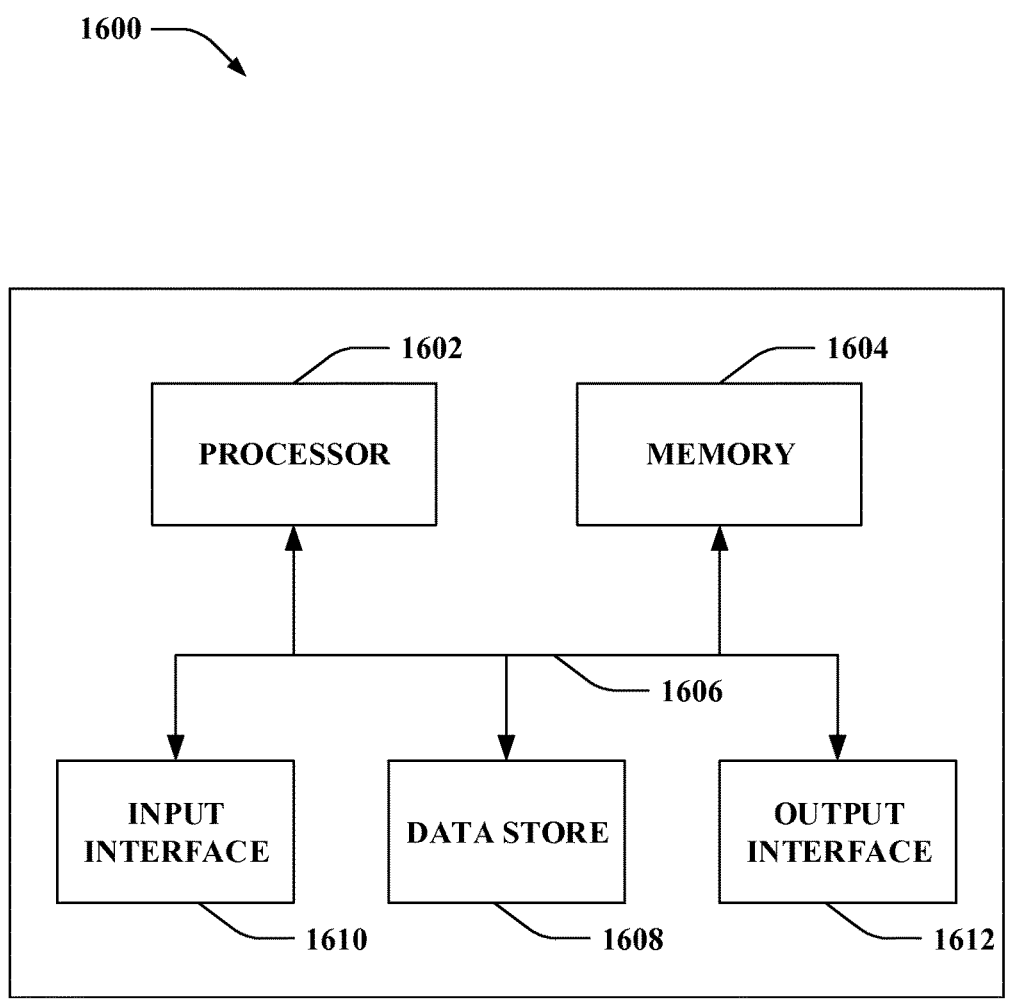
FIG. 16 illustrates an exemplary computing device.

Referring now to FIG. 16, a high-level illustration of an exemplary computing device 1600 that can be used in accordance with the systems and methodologies disclosed herein is illustrated. For instance, the computing device 1600 may be used in a system that controls a game executed by a mobile touch-enabled device. The computing device 1600 includes at least one processor 1602 that executes instructions that are stored in a memory 1604. The instructions may be, for instance, instructions for implementing functionality described as being carried out by one or more components discussed above or instructions for implementing one or more of the methods described above. The processor 1602 may access the memory 1604 by way of a system bus 1606. In addition to storing executable instructions, the memory 1604 may also store game data, visual indicators, and so forth.

The computing device 1600 additionally includes a data store 1608 that is accessible by the processor 1602 by way of the system bus 1606. The data store 1608 may include executable instructions, game data, visual indicators, etc. The computing device 1600 also includes an input interface 1610 that allows external devices to communicate with the computing device 1600. For instance, the input interface 1610 may be used to receive instructions from an external computer device, from a user, etc. The computing device 1600 also includes an output interface 1612 that interfaces the computing device 1600 with one or more external devices. For example, the computing device 1600 may display text, images, etc. by way of the output interface 1612.

Additionally, while illustrated as a single system, it is to be understood that the computing device 1600 may be a distributed system. Thus, for instance, several devices may be in communication by way of a network connection and may collectively perform tasks described as being performed by the computing device 1600.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of controlling a game with a mobile touch-enabled device, comprising:
    rendering a thumb stick within an area of a display of the mobile touch-enabled device, wherein the thumbstick is moveable within the area of the display;
    controlling whether the thumbstick is represented within the area of the display as being at a default height or a depressed height, wherein the area of the display outside the thumbstick comprises a first visual indicator when the thumbstick is at the default height and a differing, second visual indicator when the thumbstick is at the depressed height;
    detecting a touch within the area of the display;
    controlling a first operation in the game based on the touch within the area of the display, wherein the first operation in the game differs based on whether the thumbstick is represented as being at the default height or the depressed height;
    changing visual information for the game based on the first operation in the game; and
    outputting the visual information for the game.

2. The method of claim 1, further comprising:
    receiving first data from a sensor of the mobile touch-enabled device indicative of an amount of tilt of a corner of the mobile touch-enabled device relative to a predetermined plane;
    controlling a second operation in the game based on the amount of the tilt of the corner of the mobile touch-enabled device; and
    changing the visual information for the game based on the second operation in the game.

3. The method of claim 1, wherein the amount of the tilt of the corner of the mobile touch-enabled device maps to analog input information for the game, and a level of the analog input information for the game remains constant when the amount of the tilt of the corner of the mobile touch-enabled device remains constant relative to the predetermined plane.

4. The method of claim 1, wherein a surface of the display of the mobile touch-enabled device for a preset orientation of the mobile touch-enabled device defines the predetermined plane.

5. The method of claim 1, further comprising identifying an orientation of the mobile touch-enabled device at a time of powering on the mobile touch-enabled device, wherein a surface of the display of the mobile touch-enabled device at the orientation at the time of powering on the mobile touch-enabled device defines the predetermined plane.

6. The method of claim 1, further comprising identifying an orientation of the mobile touch-enabled device at a time of starting the game, wherein a surface of the display of the mobile touch-enabled device at the orientation at the time of starting the game defines the predetermined plane.

7. The method of claim 1, further comprising identifying an orientation of the mobile touch-enabled device after a predetermined amount of time has lapsed without tilting the mobile touch-enabled device, wherein a surface of the display of the mobile touch-enabled device at the orientation identified after the predetermined amount of time has lapsed defines the predetermined plane.

8. The method of claim 1, further comprising:
    receiving second data from the sensor of the mobile touch-enabled device indicative of a second amount of tilt of a second corner of the mobile touch-enabled device relative to the predetermined plane;
    controlling a third operation in the game based on the second amount of the tilt of the second corner of the mobile touch-enabled device; and
    changing the visual information for the game based on the third operation in the game.

9. The method of claim 8, wherein the corner and the second corner are tilted together relative to the predetermined plane.

10. The method of claim 1, wherein outputting the visual information for the game further comprises rendering the visual information for the game on the display of the mobile touch-enabled device.

11. The method of claim 1, further comprising:
    receiving data from a sensor of the mobile touch-enabled device, the data indicative of rotation of the mobile touch-enabled device in a plane defined by a surface of the display of the mobile touch-enabled device;

controlling a second operation in the game based on the rotation of the mobile touch-enabled device; and
changing the visual information for the game based on the second operation in the game.

12. The method of claim 1, further comprising:
receiving data from a sensor of the mobile touch-enabled device, the data indicative of movement of the mobile touch-enabled device one of upwards or downwards in a plane defined by a surface of the display of the mobile touch-enabled device;
controlling a second operation in the game based on the movement of the mobile touch-enabled device; and
changing the visual information for the game based on the second operation in the game.

13. The method of claim 1, further comprising:
receiving a series of images from a camera of the mobile touch-enabled device;
tracking movement of a head of a user from the series of images;
controlling a second operation in the game based on the movement of the head of the user; and
changing the visual information for the game based on the second operation in the game.

14. The method of claim 1, further comprising:
receiving a series of images from a camera of the mobile touch-enabled device;
detecting a facial gesture of a user from the series of images;
controlling a second operation in the game based on the facial gesture of the user; and
changing the visual information for the game based on the second operation in the game.

15. A mobile touch-enabled device, comprising:
a display;
at least one processor; and
memory that comprises computer-executable instructions that, when executed by the at least one processor, cause the at least one processor to perform acts including:
rendering a thumbstick within an area of the display of the mobile touch-enabled device, wherein the thumbstick is moveable within the area of the display;
controlling whether the thumbstick is represented within the area of the display as being at a default height or a depressed height, wherein the area of the display outside the thumbstick comprises a first visual indicator when the thumbstick is at the default height and a differing, second visual indicator when the thumbstick is at the depressed height;
detecting a touch within the area of the display;
controlling a first operation in a game based on the touch within the area of the display, wherein the first operation in the game differs based on whether the thumb stick is represented as being at the default height or the depressed height;
changing visual information for the game based on the first operation in the game; and
outputting the visual information for the game.

16. The mobile touch-enabled device of claim 15, further comprising:
a sensor;
wherein the memory further comprises computer-executable instructions that, when executed by the at least one processor, cause the at least one processor to perform acts including:
receiving data from the sensor of the mobile touch-enabled device indicative of an amount of tilt of a corner of the mobile touch-enabled device relative to a predetermined plane;
controlling a second operation in the game based on the amount of the tilt of the corner of the mobile touch-enabled device; and
changing the visual information for the game based on the second operation in the game.

17. A mobile touch-enabled device, comprising:
a display;
at least one processor; and
memory that comprises computer-executable instructions that, when executed by the at least one processor, cause the at least one processor to perform acts including:
displaying a thumbstick at a default height within an area of the display of the mobile touch-enabled device during a first time period, wherein the thumbstick is moveable within the area of the display, and wherein the area of the display outside the thumbstick comprises a first visual indicator when the thumbstick is at the default height;
controlling a game during the first time period based on the thumbstick being at the default height and a first touch within the area of the display when the thumbstick is at the default height;
displaying the thumbstick at a depressed height within the area of the display of the mobile touch-enabled device during a second time period, wherein the area of the display outside the thumbstick comprises a differing, second visual indicator when the thumbstick is at the depressed height; and
controlling the game during the second time period based on the thumbstick being at the depressed height and a second touch within the area of the display when the thumbstick is at the depressed height.

18. The mobile touch-enabled device of claim 17, further comprising:
a sensor;
wherein the memory further comprises computer-executable instructions that, when executed by the at least one processor, cause the at least one processor to perform acts including:
receiving data from the sensor of the mobile touch-enabled device indicative of an amount of tilt of a corner of the mobile touch-enabled device relative to a predetermined plane; and
controlling the game based on the amount of the tilt of the corner of the mobile touch-enable device.

19. The mobile touch-enabled device of claim 17, further comprising:
a sensor;
wherein the memory further comprises computer-executable instructions that, when executed by the at least one processor, cause the at least one processor to perform acts including:
receiving data from the sensor of the mobile touch-enabled device indicative of rotation of the mobile touch-enabled device in a plane defined by a surface of the display of the mobile touch-enabled device; and
controlling the game based on the rotation of the mobile touch-enabled device.

20. The mobile touch-enabled device of claim 17, further comprising:
a sensor;
wherein the memory further comprises computer-executable instructions that, when executed by the at least one processor, cause the at least one processor to perform acts including:
receiving data from the sensor of the mobile touch-enabled device indicative of movement of the mobile touch-enabled device one of upwards or downwards in a plane defined by a surface of the display of the mobile touch-enabled device; and
controlling the game based on the movement of the mobile touch-enabled device.

* * * * *